(12) United States Patent
Wirth

(10) Patent No.: US 7,161,156 B2
(45) Date of Patent: Jan. 9, 2007

(54) DETECTOR MODULE FOR AN X-RAY COMPUTER TOMOGRAPH

(75) Inventor: Stefan Wirth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/098,550

(22) Filed: Apr. 5, 2005

(65) Prior Publication Data

US 2005/0224718 A1 Oct. 13, 2005

(30) Foreign Application Priority Data

Apr. 6, 2004 (DE) .................. 10 2004 016 949

(51) Int. Cl.
*G01T 1/24* (2006.01)
*G01T 1/20* (2006.01)

(52) U.S. Cl. .............. 250/370.11; 250/336.1; 250/361 R

(58) Field of Classification Search ........... 250/370.11, 250/336.1, 361 R, 363.01, 363.02, 363.04, 250/367
See application file for complete search history.

(56) References Cited

U.S. PATENT DOCUMENTS

| | | | | |
|---|---|---|---|---|
| 4,230,510 A | * | 10/1980 | Cusano et al. ................ | 156/67 |
| 5,010,251 A | | 4/1991 | Grinberg et al. | |
| 5,153,438 A | * | 10/1992 | Kingsley et al. ........ | 250/370.09 |
| 5,378,894 A | * | 1/1995 | Akai .......................... | 250/368 |
| 5,440,130 A | * | 8/1995 | Cox et al. .............. | 250/370.09 |
| 5,464,984 A | * | 11/1995 | Cox et al. .............. | 250/370.11 |
| 6,091,795 A | * | 7/2000 | Schafer et al. ................ | 378/19 |
| 6,292,529 B1 | * | 9/2001 | Marcovici et al. ............ | 378/19 |
| 6,362,480 B1 | * | 3/2002 | Peter et al. .................. | 250/366 |
| 6,483,960 B1 | | 11/2002 | Schroedinger | |
| 6,510,195 B1 | * | 1/2003 | Chappo et al. ............... | 378/19 |
| 6,717,150 B1 | | 4/2004 | Hoffman | |

FOREIGN PATENT DOCUMENTS

| | | |
|---|---|---|
| DE | 100 32 796 A1 | 1/2002 |
| DE | 101 60 723 A1 | 9/2002 |
| DE | 102 24 227 A1 | 12/2003 |
| EP | 0 343 738 A2 | 11/1989 |

* cited by examiner

*Primary Examiner*—David Porta
*Assistant Examiner*—Mark R. Gaworecki
(74) *Attorney, Agent, or Firm*—Harness, Dickey & Pierce

(57) ABSTRACT

A detector module for an X-ray computer tomograph includes a first transducer array for converting X-radiation into light. A second transducer array is fitted on the first transducer array such that second transducer elements of the second transducer array are fitted on a side, opposite the light entrance, of a substrate of the second transducer array.

16 Claims, 2 Drawing Sheets

DETECTOR MODULE FOR AN X-RAY COMPUTER TOMOGRAPH

The present application hereby claims priority under 35 U.S.C. § 119 on German patent application numbers DE 10 2004 016 949.7 filed Apr. 6, 2004, the entire contents of which is hereby incorporated herein by reference.

FIELD OF THE INVENTION

The invention generally relates to a detector module, and/or to a detector for an X-ray computer tomograph.

BACKGROUND OF THE INVENTION

A detector module is known, for example, from DE 101 60 723 A1 and DE 102 24 227 A1. In the known detector module, signal lines are led away from a top side via two mutually opposite edges. The signal lines impede lying of further detector modules on all sides. Furthermore, the areal density of photodiodes on the second transducer array is limited by the maximum number of the signal lines that can be implemented laterally on the transducer array.

DE 100 32 796 A1 discloses an optical element in the case of which a signal from a photodiode is led to an underside of the optical element by means of plating through the substrate. The production of the through-plating is complicated in technical terms. Moreover, instances of through-plating reduce an area available for fitting photodiodes, and in particular limit a maximum possible areal density of the photodiodes.

SUMMARY OF THE INVENTION

It is an object of an embodiment of the invention to reduce or even dispense with at least one of the disadvantages of the prior art. In particular, one aim of at least one embodiment is to specify a detector module that can be produced in a simple way and with a small or even minimum number of process steps. Moreover, an aim of at least one embodiment may be for it to be possible to lay further detector modules against the detector modules on all sides without an appreciable interspace.

An embodiment of the invention provides that the substrate is transparent to the light emerging from the first transducer elements, wherein second transducer elements are fitted on a first underside opposite the light entrance side of the second transducer array. It is thereby possible for the signal lines of the second transducer array to be led away from the underside thereof. The proposed detector module can be arranged in a simple way in a surface and with edges lying against one another on all sides.

The inventive detector module of at least one embodiment results in a maximum areal density of the photodiodes owing to the number of photodiodes that can be implemented in a surface of a second transducer element, and/or of the signal lines that can be implemented at the underside. The maximum areal density is increased by comparison with a detector module according to the prior art. Moreover, the light entrance area is not reduced by contacts.

The substrate is transparent to light emerging from the first transducer elements in the case of a detector module according to an embodiment of the invention. The light emerging from the first transducer elements penetrates the substrate and can be detected on the underside by way of the second transducer elements. The first transducer array can be fitted on the second transducer array by way of an adhesive, for example.

The first transducer elements are expediently produced from scintillator materials, preferably from $Gd_2O_2S$ doped with Eu, Pr or Tb. The second transducer elements can contain at least one photodiode in each case.

According to a further refinement of at least one embodiment of the invention, the substrate materials are electrically insulating. By comparison with semiconducting substrate materials, for example, such substrate materials have smaller parasitic capacitances that have an interfering effect on the signals of the second transducer elements.

According to an advantageous refinement of at least one embodiment of the invention, the substrate is produced from a metal oxide, preferably from sapphire. Sapphire is optically transparent and electrically non-conducting. In particular, the already described advantages of optically transparent and electrically non-conducting substrates can be utilized. Moreover, sapphire surfaces can be processed so as to exhibit a very good planarity and a low roughness. This permits optimum optical coupling of the second transducer array to the first transducer array.

According to a further refinement of at least one embodiment, there is an assignment rule according to which each of the first transducer elements is assigned to at least one of the second transducer elements. The light emerging from a first transducer element is detected by at least one second transducer element. The assignment rule permits spatially resolved detection of the X-radiation impinging on the detector module.

According to a further expedient refinement of at least one embodiment, further components are fitted on the underside of the second transducer array. These are preferably analog-to-digital converters, amplifiers or the like. Together with the components, if appropriate, the second transducer elements can be constituents of integrated circuits. The components or integrated circuits can be fitted in a simple way on the underside of the second transducer element. They do not interfere with the efficiency of the conversion into electric signals of the light falling onto the second transducer elements. In particular, they permit direct further processing and processing of the electric signals.

According to a further stipulation of at least one embodiment of the invention, provision is made of a detector that is built up from detector modules according to at least one embodiment of the invention. The detector modules can be arranged with their edges lying against one another on all sides. In this case, a surface formed by the detector surfaces on the beam entry side can also be of curved design, for example have a convex, concave, spherical or cylindrical curvature. In particular, it is possible to adapt the geometry of the surface to the beam geometry of the X-ray tube or of an object to be examined, for example the size of the object. By comparison with conventional detectors, it is possible to implement a greater number of rows owing to a juxtaposition of a number of detector modules in the y-direction. The number of the rows is given in this case by the sum of the rows implemented for each detector module.

BRIEF DESCRIPTION OF THE DRAWINGS

The invention is explained below in more detail with the aid of example embodiment and the figures, in which.

DETAILED DESCRIPTION OF THE EXEMPLARY EMBODIMENTS

Figure 1A:
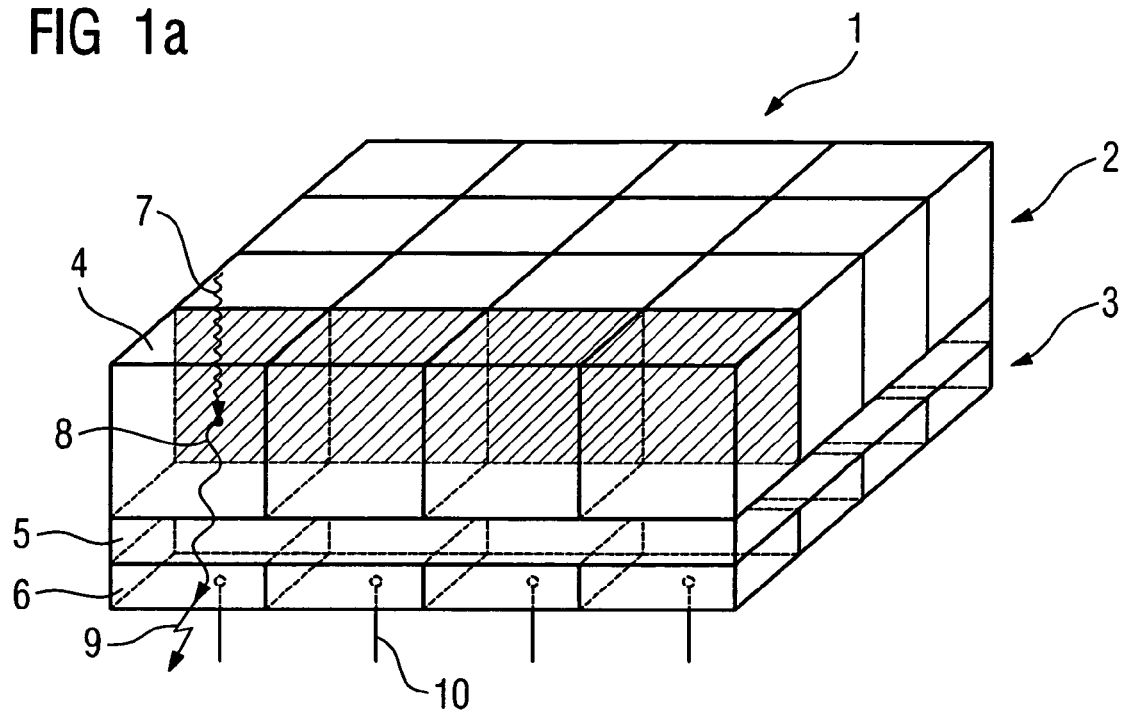
FIG. 1a shows a schematic design of a detector module.
Figure 1B:
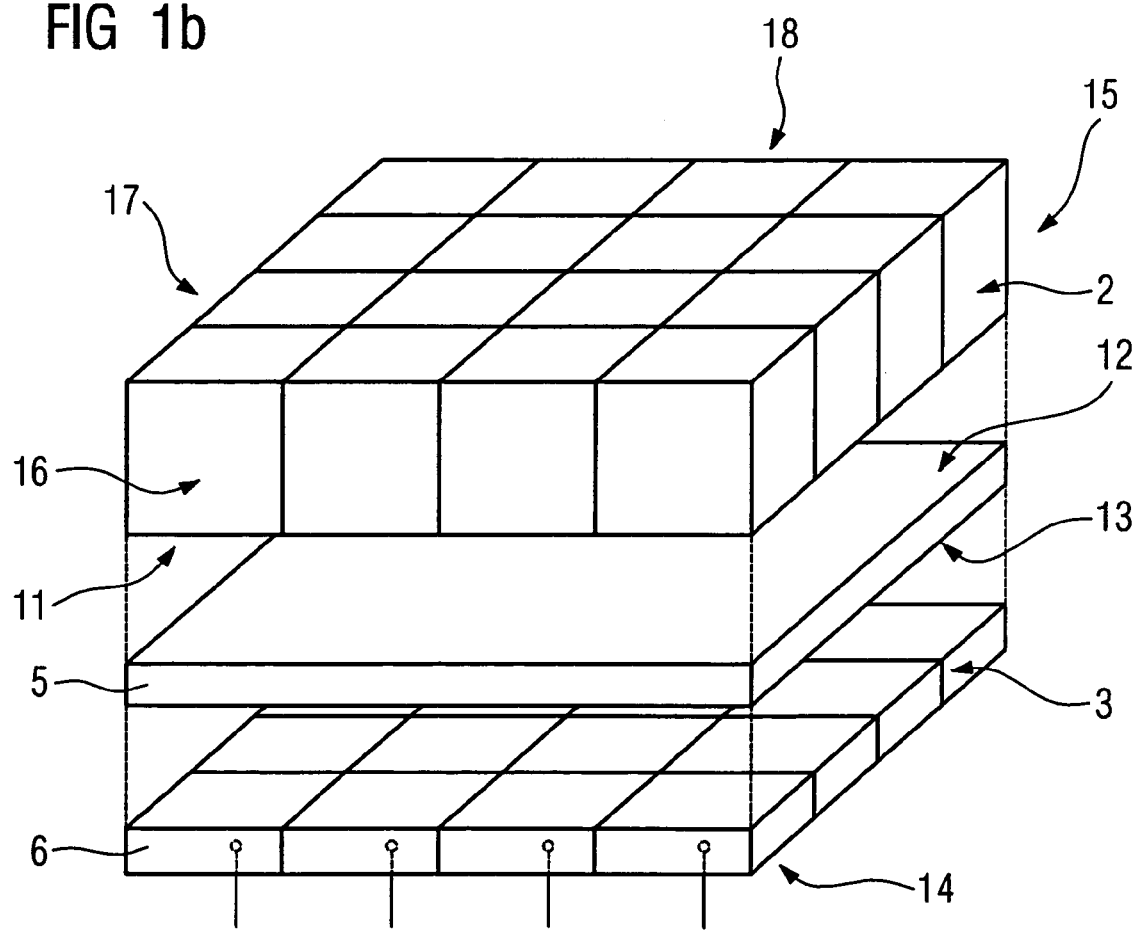
FIG. 1b shows an exploded drawing in accordance with FIG. 1.

FIGS. 1a and b show a detector module 1 schematically. This includes a scintillator array 2 and of a photodiode array 3. The scintillator array 2 has a number of scintillators 4 arranged in two dimensions in the manner of a chess board. The photodiode array 3 has a substrate 5 that is produced, for example, from sapphire. The substrate 5 is transparent. It is also possible to use other suitable transparent materials instead of sapphire. A multiplicity of photodiodes 6 are fitted in two dimensions, likewise in the manner of a chess board on an underside 13 of the substrate 5. Signal lines leading away from the photodiodes 6 are denoted by the reference 10.

With a light entrance side 12, the substrate 5 is fitted on a light exit side 11 of the scintillator array 2. The photodiodes 6 are fitted on a first underside 13 opposite the light entrance side 12. A photodiode 6 is assigned to each scintillator 4. The signal lines 10 are led away from a second underside 14 opposite the light entrance side 12. The detector module has four lateral surfaces 15–18 perpendicular to the light entrance side 12. No signal lines 10 are led away from the lateral surfaces 15–18.

The detector module functions as follows:

X-radiation 7 incident on the scintillators 4 is converted into light 8. The light 8 penetrates the substrate 5 and falls onto the photodiodes 6. The latter convert the light 8 into electric signals 9. The electric signals 9 are led by way of signal lines 10 to an apparatus for further processing (not shown here).

Figure 2:
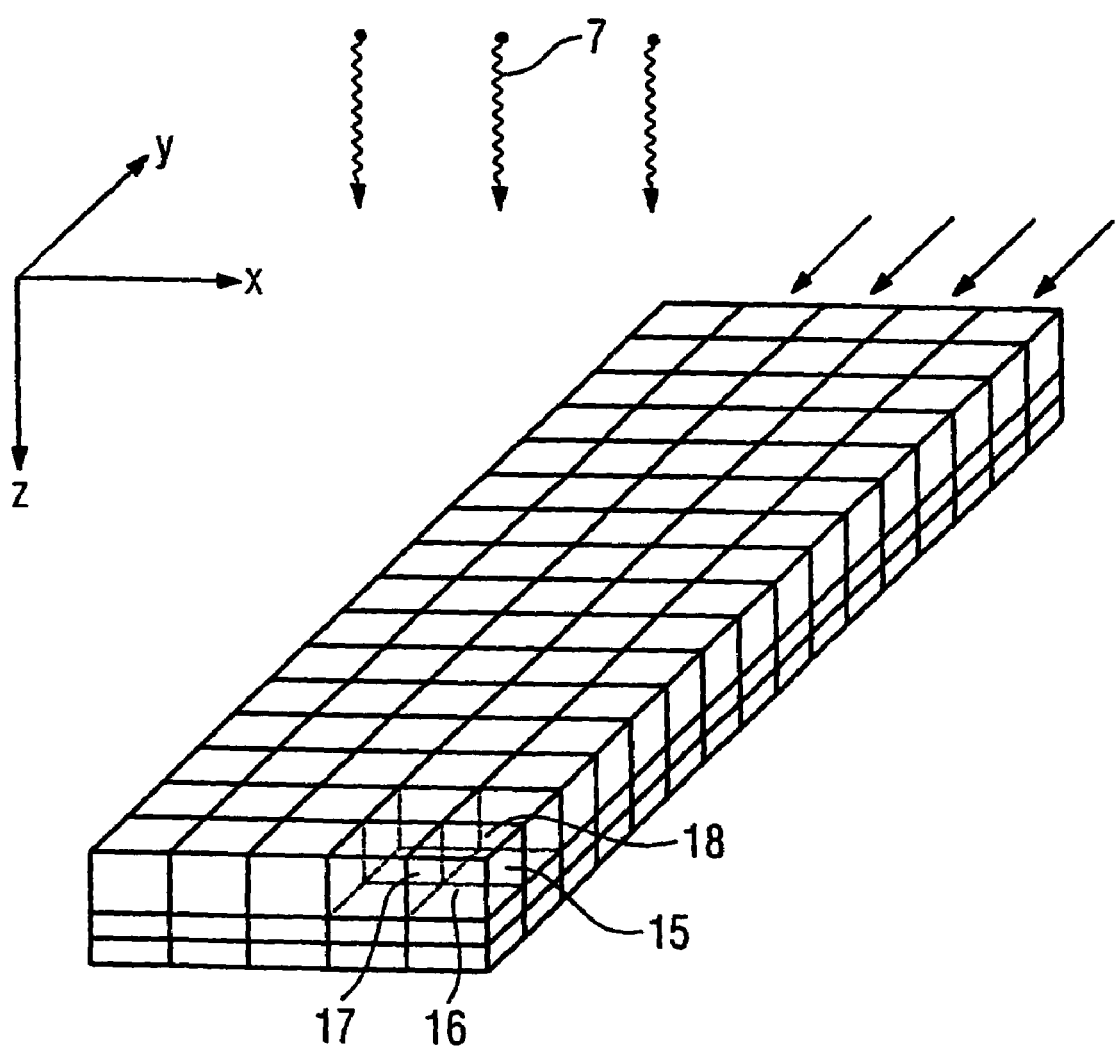
FIG. 2 shows a two-dimensional arrangement of detector modules.

FIG. 2 shows an x-ray detector including a number of detector modules, preferably of square design, arranged along the lateral surfaces 15–18 in the manner of a chess board. The proposed detector can be used to detect X-radiation 7 in terms of two directions x and y perpendicular to the direction of incidence z of the -X-radiation 7. The detector module is of planar design here. It is also, however, possible for the detector to be curved, for example in the y-direction, as well. In general, arbitrarily curved surfaces can be implemented depending on the size of the detector modules.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detector module for an X-ray computer tomograph, comprising:
    a first transducer array having a multiplicity of first transducer elements that convert X-radiation into light; and
    a second transducer array, including a multiplicity of second transducer elements that convert light into electric charge, the second transducer elements being fitted on a first underside of a substrate that is transparent to the light emerging from the first transducer elements, the second transducer array being connected with a second side of the substrate, which is opposite to the first underside, on a light exit side of the first transducer array via an adhesive.

2. The detector module as claimed in claim 1, wherein the first transducer elements are produced from scintillator materials and the second transducer elements each contain at least one photodiode.

3. The detector module as claimed in claim 1, wherein the substrate is produced from an electrically insulating material.

4. The detector module as claimed in claim 3, wherein the material is produced from a metal oxide.

5. The detector module as claimed in claim 1, wherein each of the first transducer elements is assigned to at least one of the second transducer elements.

6. The detector module as claimed in claim 1, wherein the transducer elements form a second underside, which is opposite to the first underside of the substrate and wherein signal lines connected to the second transducer elements are led away from the second underside.

7. The detector module as claimed in claim 6, wherein additional components are mounted on the second underside.

8. The detector module as claimed in claim 1, wherein the components include at least one of analog-to-digital converters and amplifiers.

9. The detector module as claimed in claim 1, wherein the second transducer elements are designed as an integrated circuit together with the components.

10. A detector for an X-ray computer tomograph, comprising a number of the detector modules according to claim 1, arranged lying against one another at their edges.

11. The detector module as claimed in claim 1, wherein the first transducer elements are produced from $Gd_2O_2S$ doped with at least one of Eu, Pr, and Tb.

12. The detector module as claimed in claim 1, wherein the first transducer elements are produced from scintillator materials and the second transducer elements each contain at least one photodiode.

13. The detector module as claimed in claim 2, wherein the material is produced from sapphire.

14. A detector for an X-ray computer tomograph, comprising a plurality of the detector modules as claimed in claim 1.

15. A detector module for an X-ray computer tomograph, comprising:
    first means, including a multiplicity of elements, for converting X-radiation into light;
    second means, including a multiplicity of elements, for converting light into electric charge, the second means being fitted on a first underside of a substrate, transparent to the light emerging from the elements of the first means,
    the second means being connected with a second side of the substrate, opposite to the first underside, on a light exit side of the first means via an adhesive.

16. A detector for an X-ray computer tomograph, comprising a plurality of the detector modules as claimed in claim 15.

* * * * *